US006930305B2

(12) United States Patent
Covey et al.

(10) Patent No.: US 6,930,305 B2
(45) Date of Patent: Aug. 16, 2005

(54) METHOD AND SYSTEM FOR HIGH-THROUGHPUT QUANTITATION OF SMALL MOLECULES USING LASER DESORPTION AND MULTIPLE-REACTION-MONITORING

(75) Inventors: Thomas R. Covey, Richmond Hill (CA); John J. Corr, Bradford (CA); William H. Fisher, Schomberg (CA); Chau Tung, Mississauga (CA)

(73) Assignee: MDS, Inc., Ontario (CA)

(*) Notice: Subject to any disclaimer, the term of this patent is extended or adjusted under 35 U.S.C. 154(b) by 0 days.

(21) Appl. No.: 10/400,322

(22) Filed: Mar. 27, 2003

(65) Prior Publication Data

US 2003/0213901 A1 Nov. 20, 2003

Related U.S. Application Data

(60) Provisional application No. 60/368,195, filed on Mar. 28, 2002.

(51) Int. Cl.[7] .......................... H01J 49/00; H01J 49/40; B01D 54/44

(52) U.S. Cl. ....................... 250/288; 250/281; 250/282; 250/287

(58) Field of Search ................................ 250/288, 282, 250/281, 287

(56) References Cited

U.S. PATENT DOCUMENTS

| | | | | |
|---|---|---|---|---|
| 6,331,702 B1 | | 12/2001 | Krutchinsky et al. | |
| 6,348,688 B1 | * | 2/2002 | Vestal | 250/287 |
| 2003/0025074 A1 | * | 2/2003 | Li | 250/288 |

FOREIGN PATENT DOCUMENTS

| | | | |
|---|---|---|---|
| DE | WO 01/94924 | * | 12/2001 |
| WO | WO 99/38185 | * | 7/1999 |
| WO | WO 00/77822 A3 | | 12/2000 |

OTHER PUBLICATIONS

Cohen et al., *Small molecule analysis by MALDI mass spectrometry*, Anal. Bioanal. Chem., 373, 571–586 (2002).

Go et al., *Desorption/Ionization on Silicon Time–of–Flight/Time–of–Flight Mass Spectrometry*, Anal. Chem., 75 (10), 2504–2506 (2003).

Go et al., *Quantitative Analysis with Desorption/Ionization on Silicon Mass Spectrometry Using Electrospray Deposition*, Anal. Chem., 75 (20), 5475–5479 (2003).

Guo et al., *A Method for the Analysis of Low–Mass Molecules by MALDI–TOF Mass Spectrometry*, Anal. Chem., 74 (7), 1637–1641 (2002).

Hatsis et al., *Quantitative analysis of small pharmaceutical drugs using a high repetition rate laser matrix–assisted laser/desorption ionization source*, Rapid Communications in Mass Spectrometry, 17, 2303–2309 (2003).

Hayes et al, *Desorption–Ionization Mass Spectrometry Using Deposited Nanostructured Silicon Films*, Anal. Chem., 73 (6), 1292–1295 (2001).

(Continued)

*Primary Examiner*—John R. Lee
*Assistant Examiner*—Kalimah Fernandez
(74) *Attorney, Agent, or Firm*—Leydig, Voit & Mayer, Ltd.

(57) ABSTRACT

A mass spectrometry quantitation technique enables high-throughput quantitation of small molecules using a laser-desorption (e.g., MALDI) ion source coupled to a triple-quadrupole mass analyzer. The ions generated from the ion source are collisionally damped/cooled, and then quantitatively analyzed using the triple-quadrupole analyzer operated in the multiple-reaction-monitoring (MRM) mode. Significantly improved measurement sensitivity is obtained by applying laser pulses to the ion source at a high pulse rate of about 500 Hz or higher. This allows the data acquisition to be performed rapidly, and the speed of about one second for each sample point on the ion source target has been achieved.

17 Claims, 12 Drawing Sheets

OTHER PUBLICATIONS

Kinumi et al., *MALDI–TOP/MS using Inorganic Particle Matrix for Small Molecule Analysis*, Proceedings of the 48$^{th}$ ASMS Conference on Mass Spectrometry and Allied Topics (2000).
Leriche et al., *An experimental comparison of electrospray ion–trap and matrix–assisted laser desorption/ionization post–source decay mass spectra for the characterization of small drug molecules*, Rapid Communications in Mass Spectrometry, 15, 608–614 (2001).
Lin et al., *Laser Desorption/Ionization Time–of–Flight Mass Spectrometry on Sol–Gel–Derived 2,5–Dihydroxbenzoic Acid Film*, Anal. Chem., 74 (22), 5793–5798 (2002).
Reyzer et al., *Direct analysis of drug candidates in tissue by matrix–assisted laser desorption/ionization mass spectrometry*, Journal of Mass Spectrometry, 38, 1081–1092 (2003).
Shen et al., *Porous Silicon as a Versatile Platform for Laser Desorption/Ionization Mass Spectrometry*, Anal. Chem., 73 (3), 612–619 (2001).
Wei et al., *Desorption–ionization mass spectrometry on porous silicon*, Nature, 399, 243–246 (1999).
Cohen et al., Anal. Bioanal. Chem., 373, 571–586 (2002).
Go et al., Anal. Chem., 75 (10), 2504–2506 (2003).
Go et al., Anal. Chem., 75 (20), 5475–5479 (2003).
Guo et al., Anal. Chem., 74 (7), 1637–1641 (2002).
Hatsis et al., Rapid Communications in Mass Spectrometry, 17, 2303–2309 (2003).
Hayes et al, Anal. Chem., 73 (6), 1292–1295 (2001).
Kinumi et al., Proceedings of the the 48$^{th}$ ASMS Conference on Mass Spectrometry and Allied Topies (2000).
Leriche et al., Rapid Communications in Mass Spectrometry, 15, 608–614 (2001).
Lin et al., Anal. Chem., 74 (22), 5793–5798 (2002).
Reyzer et al., Journal of Mass Spectrometry, 38, 1081–1092 (2003).
Shen et al., Anal. Chem., 73 (3), 612–619 (2001).
Wei et al., Nature, 399, 243–246 (1999).

* cited by examiner

METHOD AND SYSTEM FOR HIGH-THROUGHPUT QUANTITATION OF SMALL MOLECULES USING LASER DESORPTION AND MULTIPLE-REACTION-MONITORING

RELATED APPLICATION

This application claims the priority of U.S. Provisional Application No. 60/368,195, filed Mar. 28, 2002.

FIELD OF THE INVENTION

The present invention relates generally to mass spectrometry, and more particularly to a way to perform high-throughput quantitation of small molecules.

BACKGROUND OF THE INVENTION

Quantitative analyses of pharmaceutically and biologically important compounds, such as drugs and metabolites, are important applications of mass spectroscopy. Traditionally, ion sources based on electrospray (ESI) ionization and atmospheric pressure chemical ionization (APCI) are used in combination with triple-quadrupole mass spectrometers to provide quantitative analysis. The combination provides both high sensitivity and high specificity. ESI and APCI both generate ions from flowing liquid streams, and are therefore used by pumping organic and aqueous solvent streams containing the compounds to be analyzed through the source. Liquid chromatography is commonly used as an on-line separation technique prior to the mass spectrometer. Thus, samples can be introduced by injecting a known volume containing the sample into the liquid flow, and using the mass spectrometer to monitor specific combinations of ion mass/charge values that correspond to known precursor and product fragment ions using the scan mode known as multiple-reaction-monitoring (MRM) mode. During the scan, samples are injected sequentially, at a rate in the order of 1 per 10 second, due to limitations in autosamplers, as well as limitation imposed by the natural width of the eluting peak. Once the sample has passed through the ion source, it is ionized and dissipated in the source, with only a small fraction of the ions generated from the sample actually being sampled into the mass spectrometer system.

Matrix assisted laser desorption/time-of-flight (MALDI/TOF) is a different type of mass spectrometer technique, in which samples are mixed with a UV-adsorbing compound (the matrix), deposited on a surface, and then ionized with a fast laser pulse. A short burst or plume of ions is created in the ion source of the mass spectrometer by the laser, and this plume of ions is analyzed by a time-of-flight mass spectrometer, by measuring the flight time over a fixed distance (starting with the ion creating pulse). This technique is inherently a pulsed ionization technique (required for the time-of-flight mass spectrometer) as well as a batch-processing technique, since samples are introduced into the ion source in a batch (of samples located in small spots on a plate) rather than in a continuous flowing liquid steam. MALDI/TOF has been almost exclusively used for the analysis of biopolymers such as peptides and proteins. The technique is sensitive and works well for fragile molecules such as those mentioned, and the TOF method is particularly suitable for the analysis of high-mass compounds. However, until recently, there has been no viable method of doing true MS/MS with this type of instrument. Instead, the method of post-source decay (PSD) is used to provide some fragmentation information. In this technique, precursor ions are selected in the flight tube with an ion gate, and then those ions that fragment before the ion mirror (due to excess energy carried away from the source) can be mass resolved. This technique provides relatively poor sensitivity and mass accuracy, and is not considered to be a high performance MS/MS technique. The MALDI technique also suffers from the fact that while the mass accuracy and resolution can be very high (up to 30,000 resolution at low mass, and accuracy of a few parts-per-million), these important features are difficult to achieve because they depend on the microstructure of the sample surface (roughness), the laser fluence, and other instrumental characteristics which can be hard to control. Good mass accuracy typically requires that calibration compounds be placed on the sample surface close to the actual sample itself. The MALDI/TOF technique has mainly been used for spectral analyses. Some previous attempts have been made to use MALDI for quantitative analysis, but they have met with limited success because of the poor precision obtained with MALDI/TOF.

Recently, the method of combining MALDI with orthogonal TOF has been introduced by a group at the University of Manitoba. This technique, called Orthogonal MALDI, or "oMALDI™" (trademark of Applied Biosystems/MDS SCIEX Instruments, Concord, Ontario, Canada) as described in U.S. Pat. No. 6,331,702 (assigned to the University of Manitoba), is an apparatus and method enabling a pulse source, such as a MALDI source, to be coupled to a variety of spectrometer instruments, in a manner which more completely decouples the spectrometer form the source and provides a more continuous ion beam with smaller angular and velocity spreads. In this technique, ions generated from a MALDI source as plumes (typically at the rate of less than 20 Hz, with pulse widths of a few nanoseconds from the laser pulse) are collisionally cooled in a relatively high pressure region containing a damping gas within an RF ion guide. Collisions with the damping gas convert the plumes into a quasi-continuous beam. This quasi-continuous beam is then analyzed with orthogonal time-of-flight, in which the ions enter orthogonally to the axis of the TOF and are pulsed sideways.

There are several advantages to this combination that are not available from conventional MALDI/TOF. The TOF resolution and mass accuracy are decoupled from the source conditions such as laser fluence and sample morphology. The ions are slowed to near thermal energies from which they can conveniently be re-accelerated to tens of electron volts for collisionally activated decomposition (CAD) in a collision cell. The flux of ions in the beam is low enough (through having beam stretched out in time) that a time-to-digital converter (TDC) can be used for ion detection. The result is that high mass accuracy and resolution can be achieved under a wide range of operating conditions. In addition, a mass resolving quadrupole and collision cell can be placed before the TOF analyzer to provide an MS/MS configuration. Precursor ions from the MALDI source are collisionally cooled, then selected by the quadrupole mass filter, fragmented in the collision cell, and the fragments mass analyzed by the TOF. This provides high mass resolution and sensitivity for MS/MS of MALDI ions, which has not been previously available. This MS/MS configuration is referred to as QqTOF, where Q refers to the mass filter quadrupole and q refers to the RF-only collision cell.

The Manitoba group recognized that the oMALDI™ technique allows a MALDI source to be efficiently coupled to a quadrupole mass spectrometer system, because of the near-continuous nature of the ion beam. However, there is no recognition that this might offer improved ability to measure sample concentrations quantitatively.

SUMMARY OF THE INVENTION

In view of the foregoing, the present invention provides a mass spectrometry quantitation technique that enables high-throughput quantitation of small molecules using a laser-desorption (e.g., MALDI) ion source coupled to a triple-quadrupole mass analyzer. As used herein, the term "small molecules" means compounds that are not inherently polymeric in nature and, as such, are not composed of repeating subunit classes of compounds. Small molecules fall outside the realm of biological macromolecules or polymers, which are composed of repeating subunit entities such as proteins and peptides (composed of amino acid subunits), DNA and RNA (composed of nucleic acid subunits), or cellulose (composed of sugar subunits).

In accordance with the invention, the ions generated by laser-desorption of a sample material of a small molecule are collisionally damped/cooled, and then quantitatively analyzed using the triple-quad operating in the multiple-reaction-monitoring (MRM) mode. In according with a feature of the invention, significantly improved measurement sensitivity is obtained by applying laser pulses to the ion source at a high pulse rate, preferably about 500 Hz or higher. This allows the data acquisition to be performed rapidly, and the speed of one second or so for each sample point on the ion source target has been achieved.

DETAILED DESCRIPTION OF THE INVENTION

Figure 1:
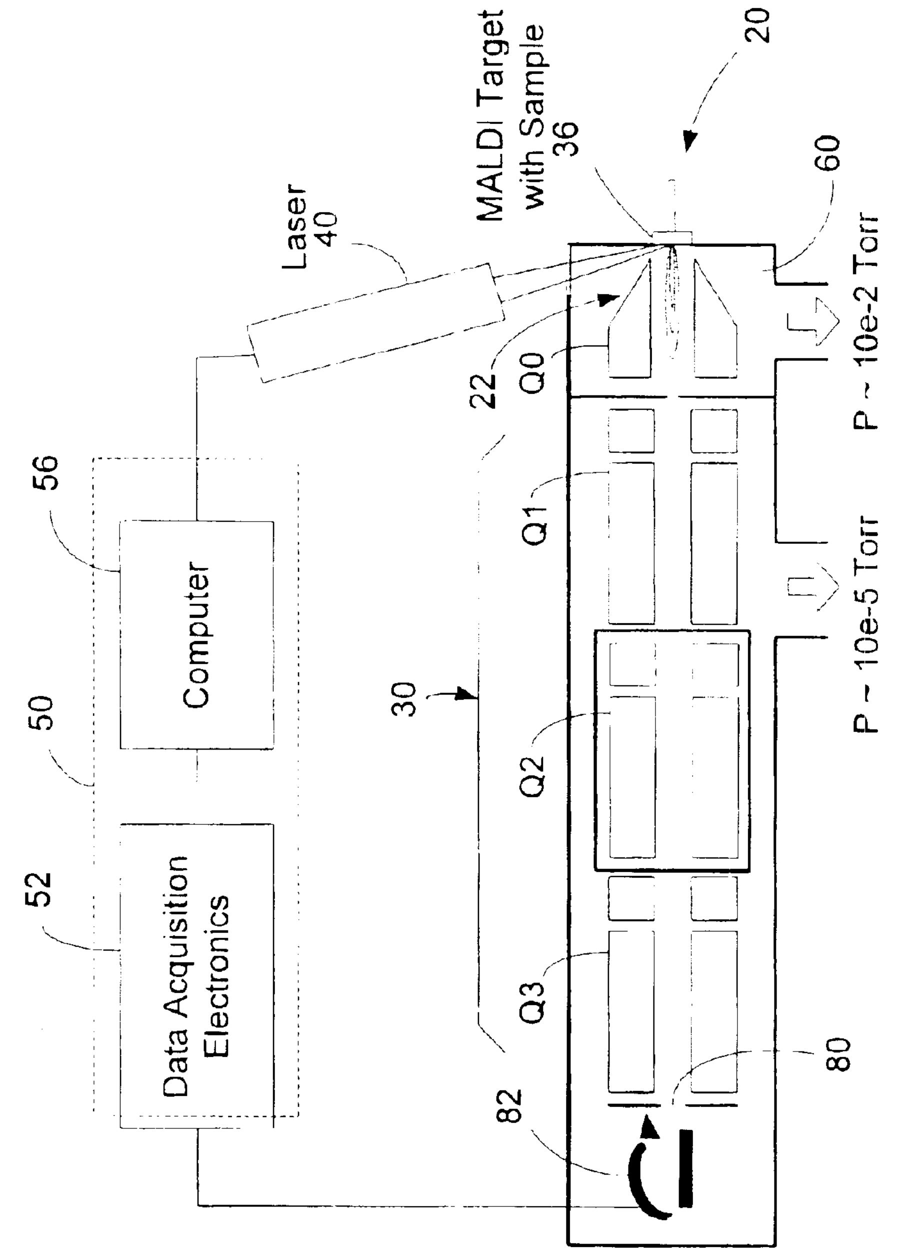
FIG. 1 is a schematic view of an embodiment of a mass spectrometer system in accordance with the invention that includes a MALDI ion source and a triple-quadrupole mass analyzer operated in the MRM mode for high-throughput quantitation of small molecules.

Referring now to the drawings, wherein like reference numerals refer to like elements, FIG. 1 shows an embodiment of a mass spectrometer system that includes an ion source and a mass analyzer. In accordance with the invention, the ion source is a matrix-assisted-laser-desorption ion (MALDI) source 20 coupled to a collision-damping setup 22, and the mass analyzer is a triple-quadrupole device 30 that is operated in the multiple-reaction-monitoring (MRM) mode. To activate the MALDI ion source, laser pulses generated by a laser 40 are directed onto a sample target 36 of the MALDI ion source 20. A described in greater detail below, the laser is of a type capable of firing at a pulse rate of a relatively high rate, such as about 500 Hz or higher.

The mass spectrometer is connected to a data acquisition system 50, which includes data acquisition electronics 52 for data collection, and a computer 56 programmed to control the operations of the system to perform mass spectrometry studies. Particularly, the computer 56 controls the pulse rate of the laser 40, and controls, via interface to the data acquisition electronics 52, the operation of the triple-quadrupole mass analyzer ("triple-quad") 30 to carry out the MRM study.

Figure 2:
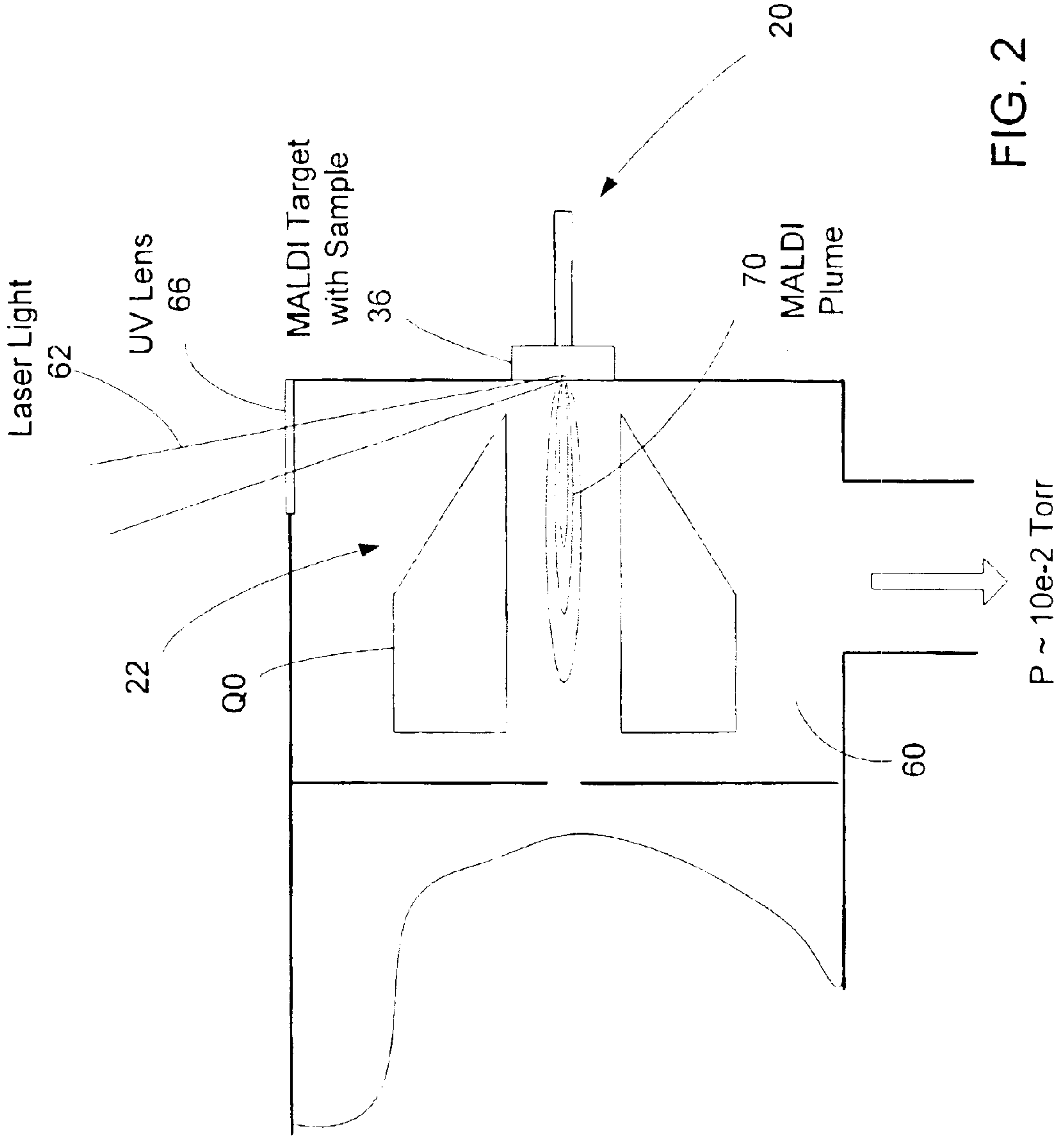
FIG. 2 is a schematic close-up view of the MALDI ion source of the mass spectrometer system of FIG. 1.

As shown in FIG. 2, in a preferred embodiment, the ions to be analyzed are generated from the target 36 of the MALDI source inside a vacuum chamber 60. The ultraviolet (UV) light 62 generated by the laser 40 is transmitted though a UV lens 66 into the vacuum chamber 60 and directed onto the surface of the MALDI sample target 36. Each laser pulse generates a plume 70 of ions from the sample target 36. This plume 70 is collisionally cooled by the gas in the vacuum chamber and confined by the quadrupole set Q0 disposed adjacent the sample target 36.

Figure 3:
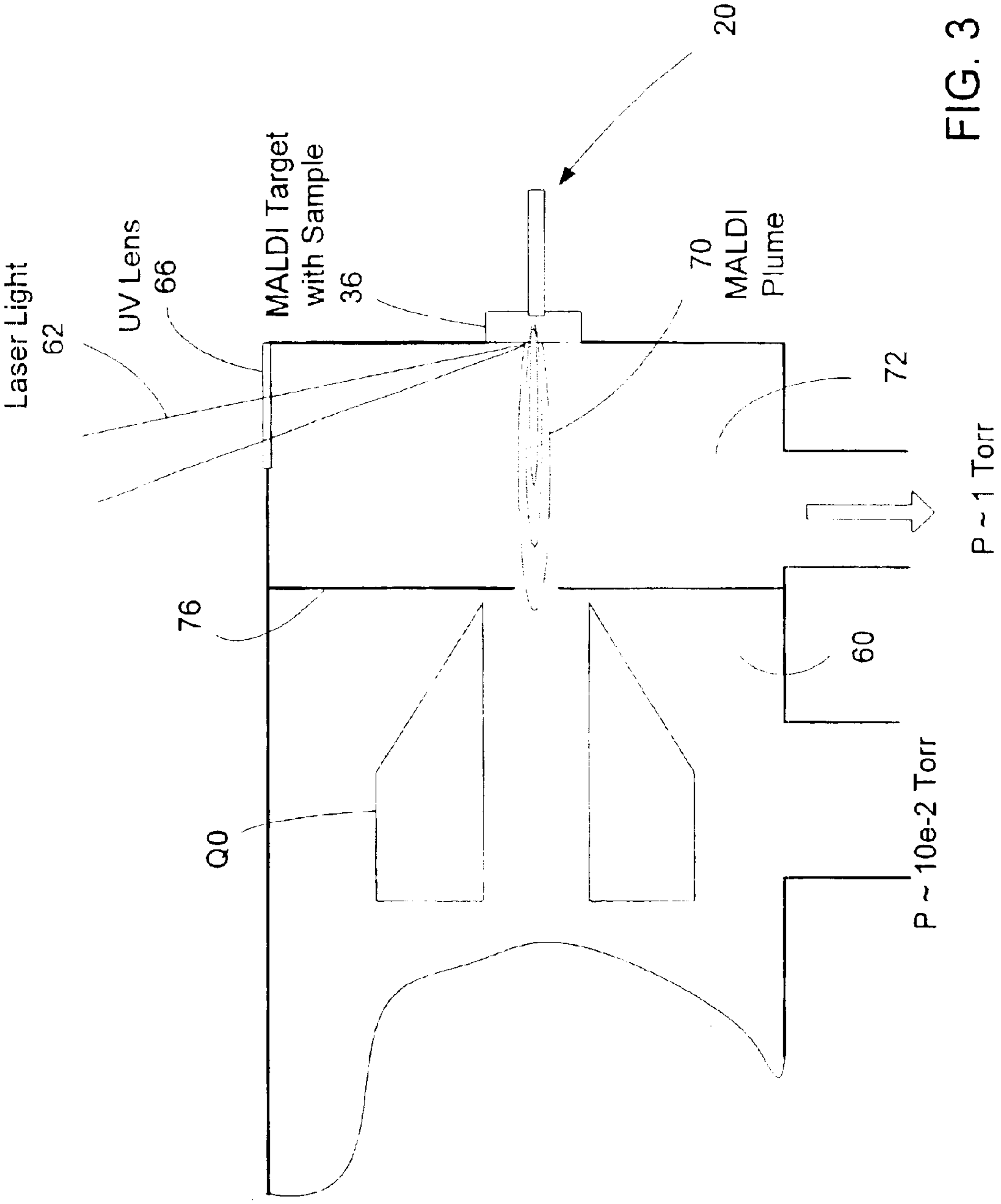
FIG. 3 is a schematic view of an alternative arrangement in which the MALDI ion source is in a differentially pumped vacuum chamber.

FIG. 3 shows an alternative embodiment in which the sample target 36 is disposed in a vacuum region 72 that is separated by partition 76 from the vacuum region 60 in which the quadrupole set Q0 sits. This arrangement allows the plume 70 coming off the sample target 36 to be exposed to a collision-damping gas at a pressure higher than the pressure in the second vacuum region 60.

Figure 4:
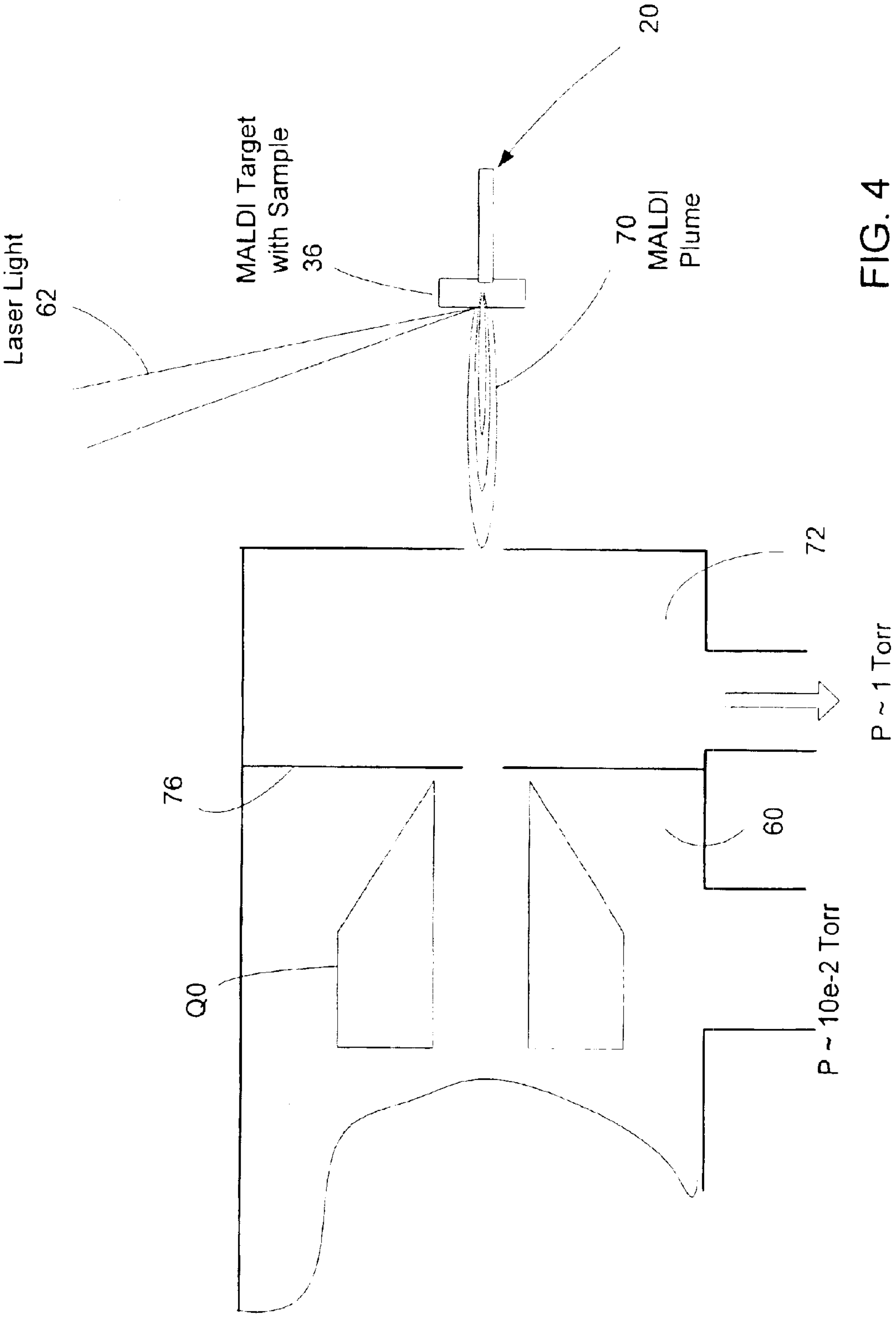
FIG. 4 is a schematic view of another alternative embodiment in which the MALDI ion source is at atmospheric pressure.

FIG. 4 shows another alternative embodiment in which the sample target 36 is positioned in the atmosphere outside the vacuum region 72. As a result, the plume 70 of ions is created in atmospheric pressure. The plume 70 of ions then passes through the differentially pumped vacuum region 72 and enters the vacuum region 60 of the quadrupole set Q0.

Returning to FIG. 1, in the illustrated embodiment, the triple-quad 30 includes three sets of quadrupole rods designated Q1, Q2, and Q3. When the triple-quad 30 is operated in the MRM mode, the first quadrupole rod set Q1 is operated to select a "precursor" ion from the plume 70 of ions generated by the MALDI source 20. The second quadrupole rod set Q2 is operated to cause fragmentation of the precursor ion selected by the first quadrupole set Q1 by means of collisions with the gas in the space confined by the rods Q2. The third quadrupole rod set Q3 is then operated to select a particular "product" ion from the ions generated by fragmenting the precursor ion. The product ion selected by the quadruple rods Q3 passes through and an aperture 80 and is collected by an electrical pulse generation device 82, such as a CHANNELTRON® electron multiplier device known to those skilled in the art. The pulses generated by the pulse generation device 82 are detected by the data acquisition electronics 52, which typically includes pulse detection devices and counters, etc. The data collected by the data acquisition electronics 52 are sent to the computer 56 for storage, display, and analyses. For purposes of the MRM mode detection, the pulses generated by the pulse generation device 82 are collected and counted as a function of the duration of time the sample target is ablated by laser pulses.

The present invention is based on the unexpected result that high throughput quantitation of small molecules can be achieved by combining a triple quad mass analyzer operating in the MRM mode with a MALDI source activated with laser pulses at a high repetition rate, such as about 500 Hz or higher, preferably between about 500 Hz and 1500 Hz, and collisionally damping the ion plumes generated by the laser pulses. The result was unexpected because prior to the discovery it was unknown whether the use of a MALDI source would allow quantitative analyses for small molecules, or what the sensitivity would be, of if there would be sufficient speed of analysis to accept a sensitivity compromise, if any. The inventors have discovered that the use of a high laser pulse rate provides enhanced sensitivity, the ability to make very high throughput quantitative measurements on certain compounds that could not be adequately detected under high throughput conditions using laser pulse rates typical in traditional MALDI, and much better reproducibility of the signal. The ability to use relatively high laser fluence without degrading the mass spectrometer signal is believed to be due to the presence of a damping gas in the ion path, which cools the ions through collisions. The collisional cooling also converts the pulsed ion beam into a quasi-continuous ion beam, which can be efficiently analyzed with a triple quadrupole mass spectrometer using the MRM mode of operation. The higher the laser pulse rate, the more continuous the ion beam becomes.

Due to the high sensitivity and throughput of the quantitation technique of the invention, measurements can be performed at a high speed. It has been shown that a laser pulse rate of about 1000–1500 Hz allows throughput rates well under one sample per second. Since high throughput quantitation is the goal, it is not desired to "hunt and peck" around on a sample spot, it is desired to aim "at" the sample spot and start taking quantitation-quality data. Choice of matrix, and hence sample spot formation may be influenced by this requirement. Many matrix materials have been tried, and the matrix material that provides the best mix of sensitivity and spot-to-spot and day-to-day reproducibility is α-cyano (α-Cyano-4-hydroxycinnamic acid)(a.k.a. HCCA). HCCA is also typically used for MALDI/TOF analysis of peptides and proteins.

In operation, samples to be analyzed are deposited on a sample target plate that typically may contain from 96 to 384, or more, sample spot positions. One of the main application areas of this quantitation technique is the quantitation of pharmaceutical compounds and their metabolites or reaction products. Solutions containing the material of interest are typically extracted from a biological sample such as blood or urine or plasma, or from a buffer solution containing enzymes that have been used to react with the samples. Some simple clean-up procedure maybe used in order to remove most of the unwanted salts or proteins. A small volume, usually less than 1 microliter, is then mixed with a matrix solution. The matrix solution is selected in order to efficiently adsorb ultraviolet light at the wavelength of the laser, which is, for example, 335 nanometers. The mixture of sample solution and matrix is deposited on the sample plate, and allowed to dry on the plate, forming a spot of crystalized material that contains the sample of interest. The plate is inserted into the ion source of the mass spectrometer. In one configuration, the plate is inserted into a holder that is moved by stepper motors such that the sample spot of interest is in front of the ion optics of the mass spectrometer. An O-ring around the sample plate provides a vacuum seal. The laser is fired repetitively at the sample spot in order to desorb and ionize the sample. The ions of interest (both those of the internal standard and those of the analyte) are monitored by the mass spectrometer, using dwell times in the range of a few milliseconds to several hundred milliseconds, depending on the laser pulse rate. As described in greater detail below, in accordance with the invention, the laser is fired at a high rate, from about 500 Hz up to, for example, about 1500 Hz. In one method, the plate remains stationary while the laser is fired for a fixed period of time (e.g. 1 second), and the ion signal intensity is integrated for this time period in order to provide a measure of the amount of sample consumed. In another method, the laser is fired until the ion signal is reduced to a low level, indicating that the sample is fully depleted in this region. In another method, the sample plate is moved in a small pattern in order to bring new regions of sample into the path of the laser light as the ion signal is being measured. This can provide a more representative signal if the sample is inhomogeneously dispersed, but more time is required to process each sample. The second method is described in more detail by the following example.

Samples for analysis are mixed in a predetermined ratio with the HCCA MALDI matrix solution, such as 1:1 ratio that reduces the analyte concentration to half of the original concentration. Samples are deposited onto the target plate using a manual pipette or any other liquid handling device capable of accurately delivering volumes in the 0.1 to 2 ul range. The liquid drops on the target plate are allowed to fully dry and crystallize before the target plate is placed into the MALDI source.

An example of the high-throughput quantitation process in accordance with the invention is described below. A fresh part of the sample spot is presented in front of the laser for the duration of the data acquisition. For quantitative MRM analysis an internal standard is include in the sample, and is therefore present in the sample spot. The chromatographic (signal as a function of time) data acquisition is started (for both the analyte and the internal standard), with the laser light not striking the sample spot. The laser light is permitted to strike the sample spot and ablate the sample from the same location on the sample spot (i.e. the sample is not moved during ablation). This causes the ion signal to increase significantly from the background level, reach a peak, and then decrease back to the background level as the sample is completely desorbed. The laser light is stopped from striking the sample spot once ion signal has returned to the background level. The laser is then moved on to the next location on the sample target from which data will be taken. The next location may be another location in the same sample spot or a completely different sample spot.

To provide a reference, data are taken for the same ion pairs for a "matrix blank" from a sample spot containing only the matrix and the sample solvent in a predetermined ratio, such as 1:1. From the data that present ion signals as a function of time, which look much like LC/MS flow injection peaks, the peak areas for the analyte and internal standard peaks are calculated, and the ratio of analyte area to internal standard area for each peak is taken, and results are plotted accordingly.

Figure 5:
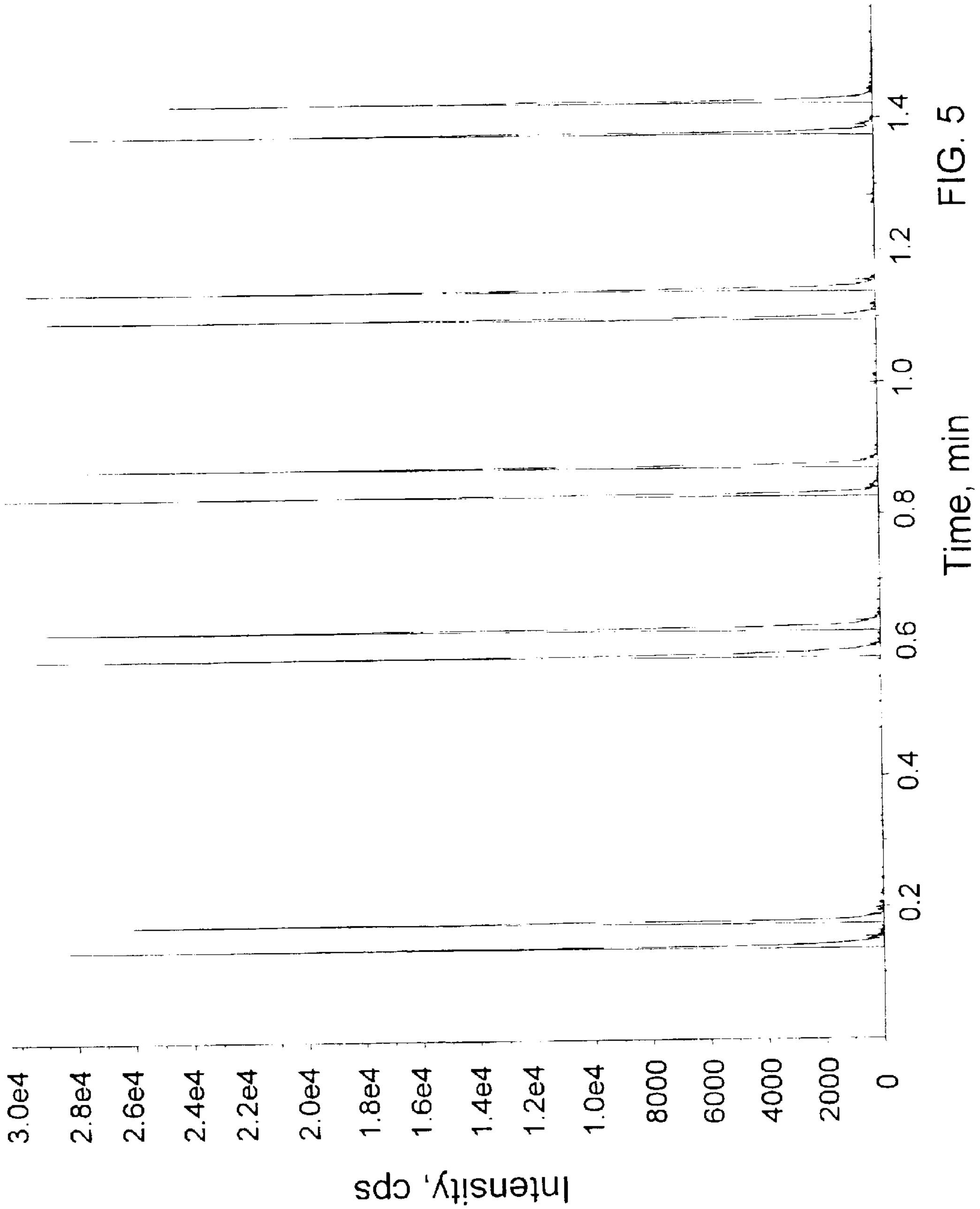
FIG. 5 is a chart showing exemplary MRM data taken using the high-throughput quantitation technique of the invention.

FIG. 5 gives an example of the type of MRM data acquired using this technique. In this case the laser was fired at two discrete locations on each of five sample spots. The analyte was 25 pg/ul Haloperidol (a commercially available compound). Data was acquired using a 20 ms dwell time to monitor the 376.0/165.1 m/z ion pair. The laser was operated at 1400 Hz and ~6 uJ per pulse. For such MRM quantitative analyses samples of 0.2 to 1 ul are deposited onto the target plate (above data was from 0.2 ul spots). There are at least 10 data points per peak in all cases. The average peak width is given by a Full Width at Half Maximum (FWHM) of 130 msec, which offers the possibility of routine analytical throughput at speeds not attainable from typical atmospheric pressure ionization sources used on mass spectrometers, such as the previously mentioned ESI and APCI sources.

Figure 6:
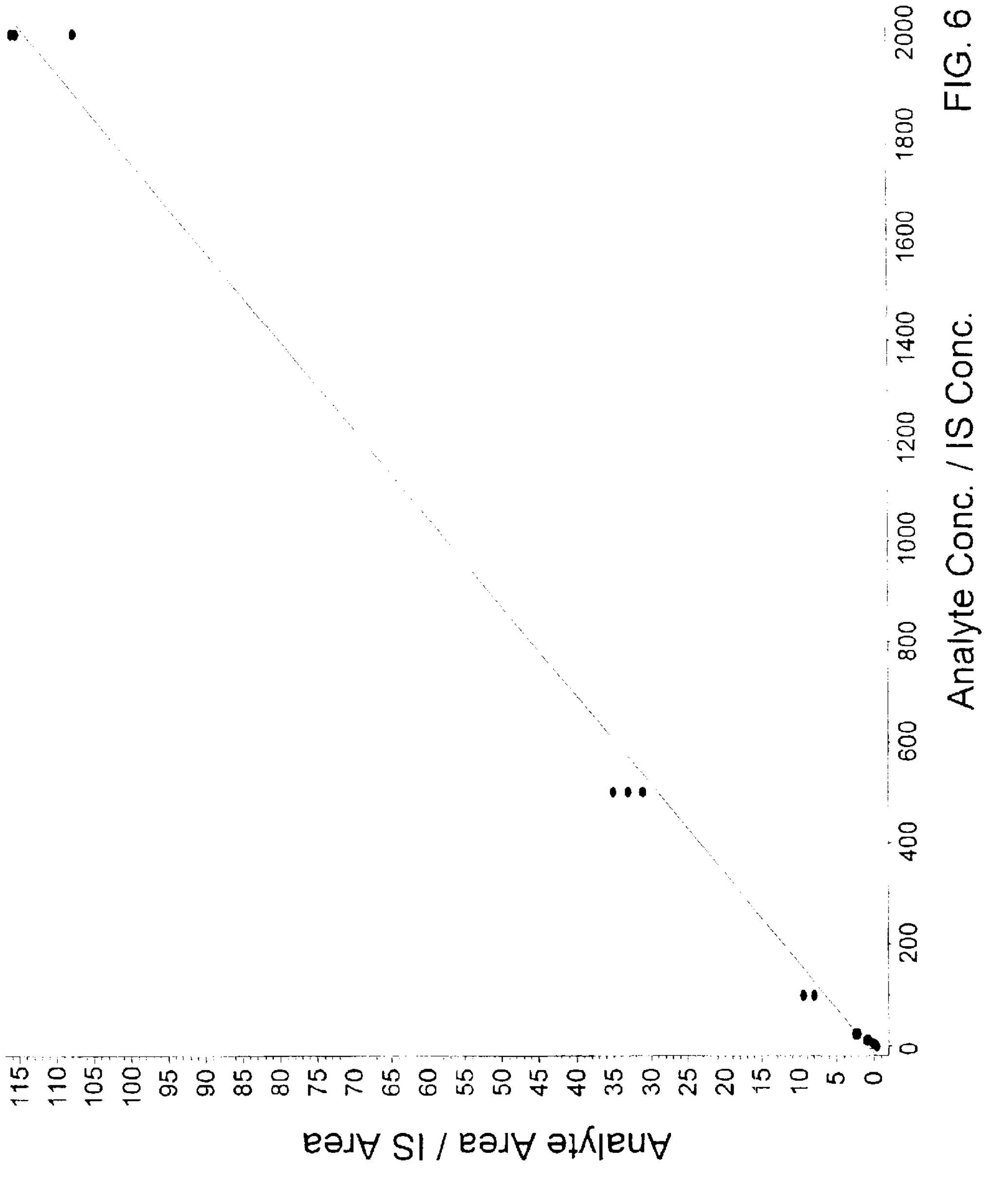
FIG. 6 is a chart showing an exemplary calibration curve.
Figure 7:
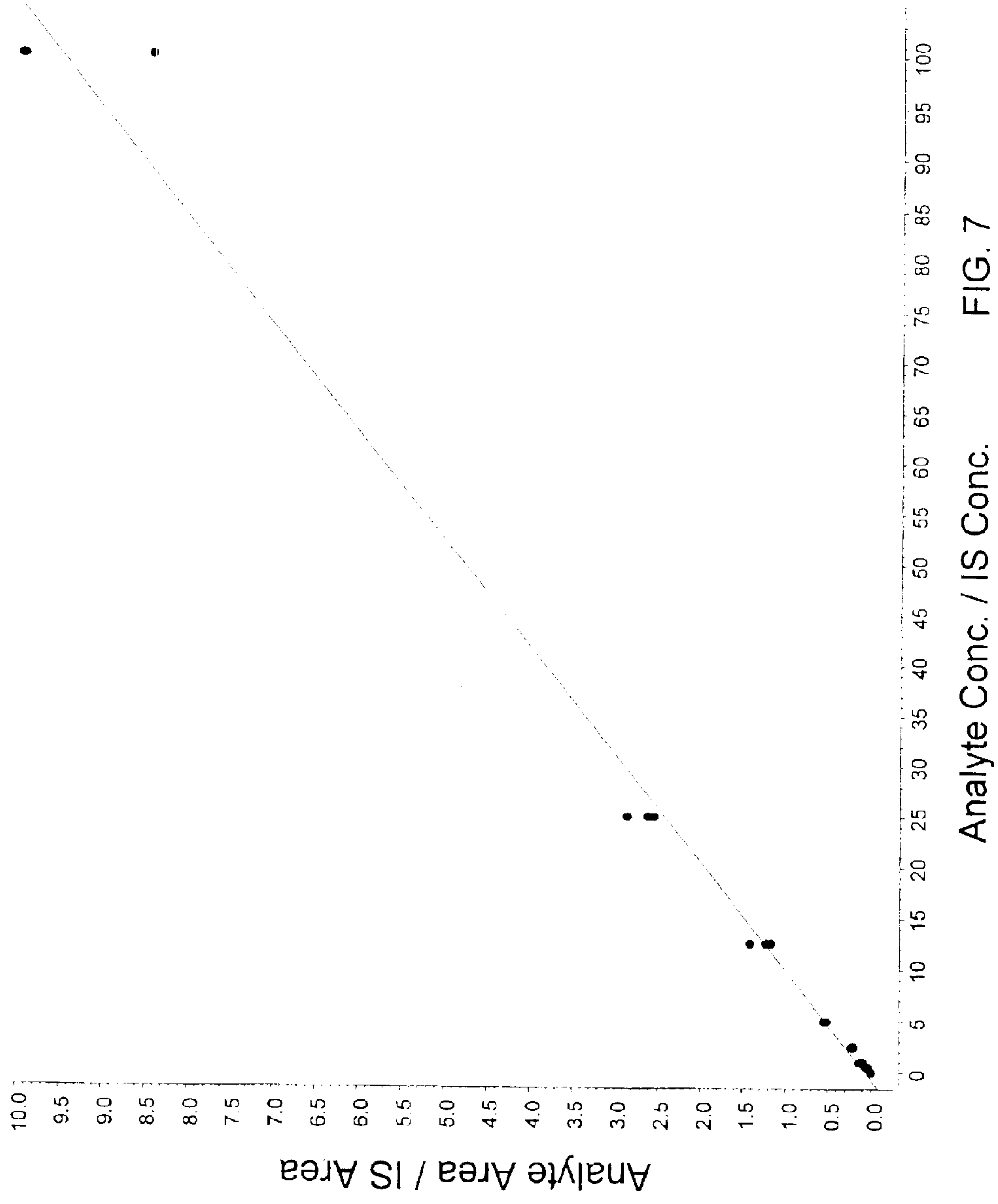
FIG. 7 is a chart showing an exemplary calibration curve similar to that of FIG. 6 but for a lower concentration range.

Using this method, calibration curves can be generated, such as the one shown in FIG. 6 for Lidoflazine, a commercially available compound. A concentration of 5 pg/ul Prazosin was included in the sample preparation, and was used as the internal standard. All MRM concentration data points were acquired in triplicate with a 10 msec dwell time for the analyte ion pair and a 10 msec dwell time for the internal standard. The ion pairs monitored were 386.2/122.0 for Lidoflazine, and 384.2/247.0 for Prazosin, the internal standard. The calibration curve used peak areas, and the analyte peak areas were ratioed to the internal standard peak areas, and a linear fit with no weighting, was used. The calibration curve covers the wide range 0.5 pg/ul to 2000 pg/ul, and includes blanks. The curve is very linear, with r=0.9979. FIG. 7 shows the same data as FIG. 6, but this time it is only analyzed over the range 0.5 pg/ul to 100 pg/ul, which is of much greater analytical interest. Over this smaller concentration range, the data has been re-analyzed and the calibration curve is, again, very linear, with r=0.9957.

Figure 8:
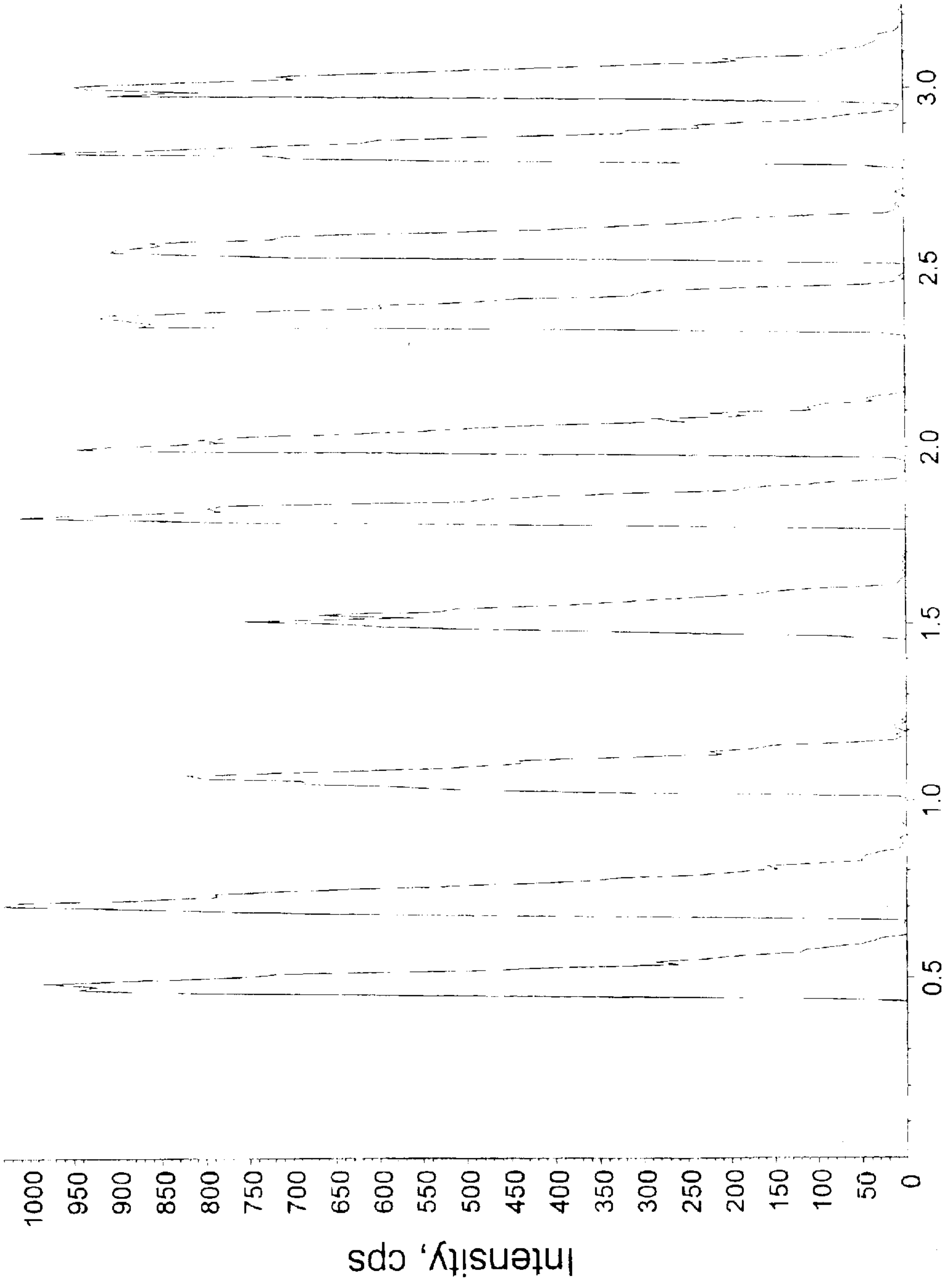
FIG. 8 is a chart showing exemplary data taken using a low laser pulse rate typically used in conventional MALDI/TOF mass spectroscopy.

As mentioned above, the laser pulse rate has a very significant influence on the possible speed of analysis, and hence on sample throughput. To provide a contrast, FIG. 8 shows MRM data taken with a Nitrogen laser operating at 40 Hz and a pulse energy of ~18 uJ per pulse. Even though this pulse rate is much lower than the laser pulse rate used in the technique of the invention, it is actually "high" for conventional MALDI use. In this case, the laser was fired at two discrete locations on each of five sample spots. The analyte was 25 pg/ul Diltiazem (a commercially available compound), and 0.2 ul sample spots were used. Data was acquired using a 500 ms dwell time to monitor the 414.9/178.1 m/z ion pair. The average peak with is given by a Full Width at Half Maximum (FWHM) of 4.51 sec. This FWHM is much greater than the value of 130 msec for the 1400 Hz data in FIG. 5 (approximately 34 times as much). In general, for lower frequencies the use of higher pulse energies causes the sample to be ablated more rapidly, yielding narrow peaks and hence higher throughput possibilities than for low pulse energies at the same lower frequencies. However, higher laser pulse energies can cause increased molecular fragmentation in the ion source region and a resulting decrease in MS/MS sensitivity. The much narrower peaks provided by higher pulse rates offer the ability to acquire data in a much more high throughput manner.

Figure 9:
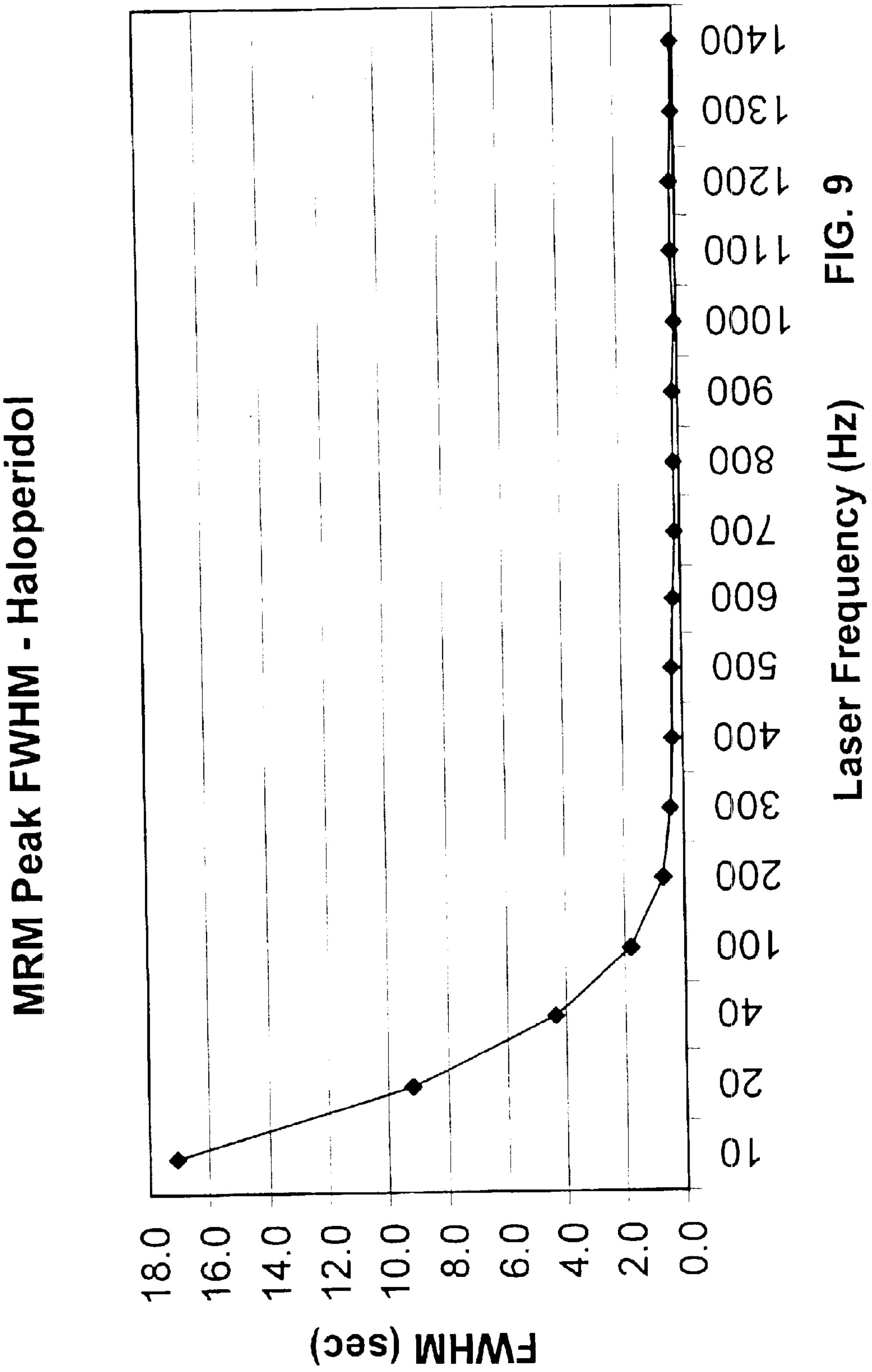
FIG. 9 is a chart showing the effect of laser pulse rate on the width of the MRM peaks.
Figure 10:
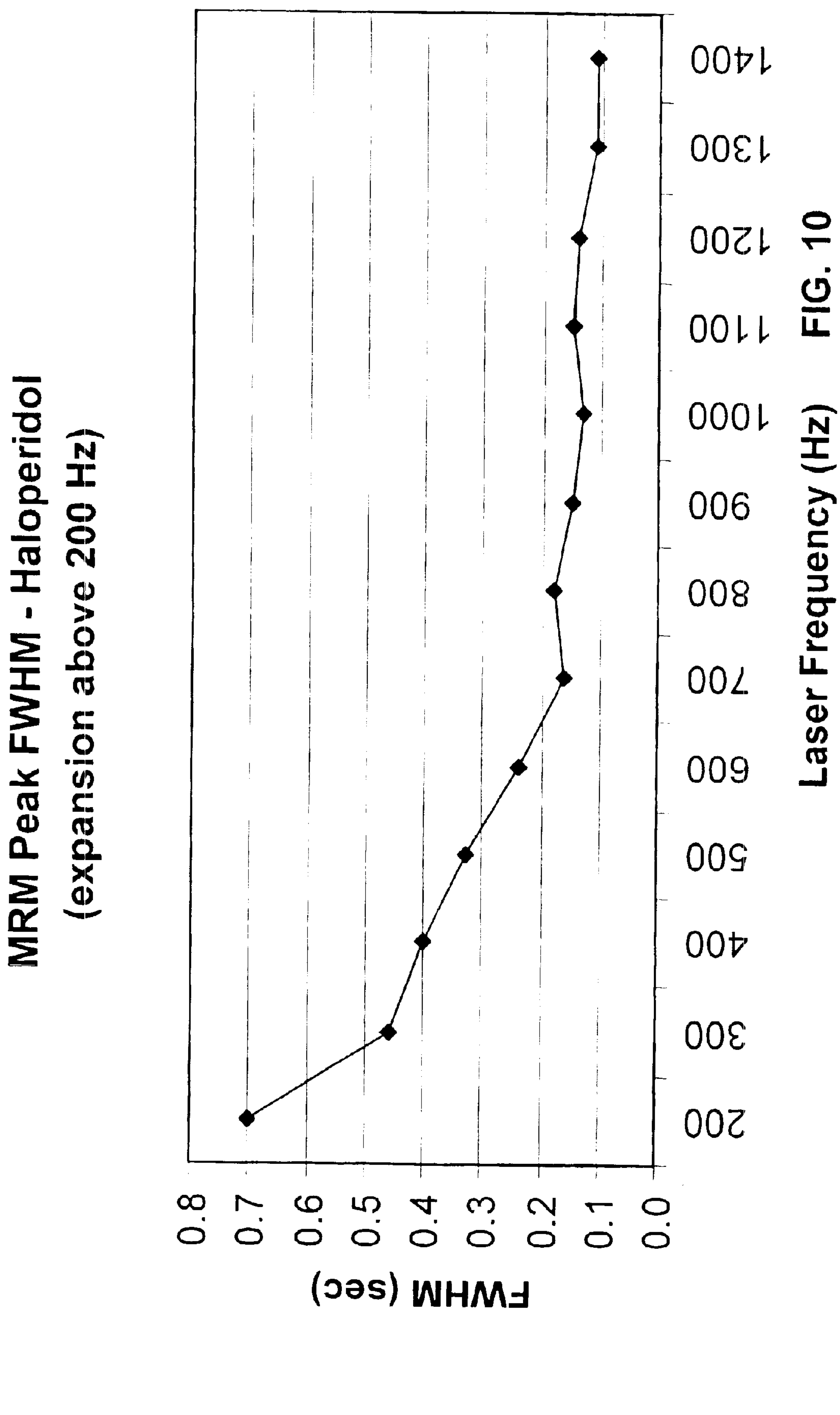
FIG. 10 is a chart showing a close-up view of a portion of the chart of FIG. 9.

FIG. 9 shows the effect of the laser pulse rate on the width of MRM peaks for Haloperidol. The laser pulse energy was kept fixed while the laser pulse rate was varied, and the FWHM was measured for each frequency. FIG. 10 is an expansion of the data shown in FIG. 7. The pulse width decreased from ~17 sec. at a laser pulse rate 10 Hz to ~0.1 sec. at a laser pulse rate of 1400 Hz. This is a decrease of ~155 times, permitting much higher sample throughput.

Figure 11:
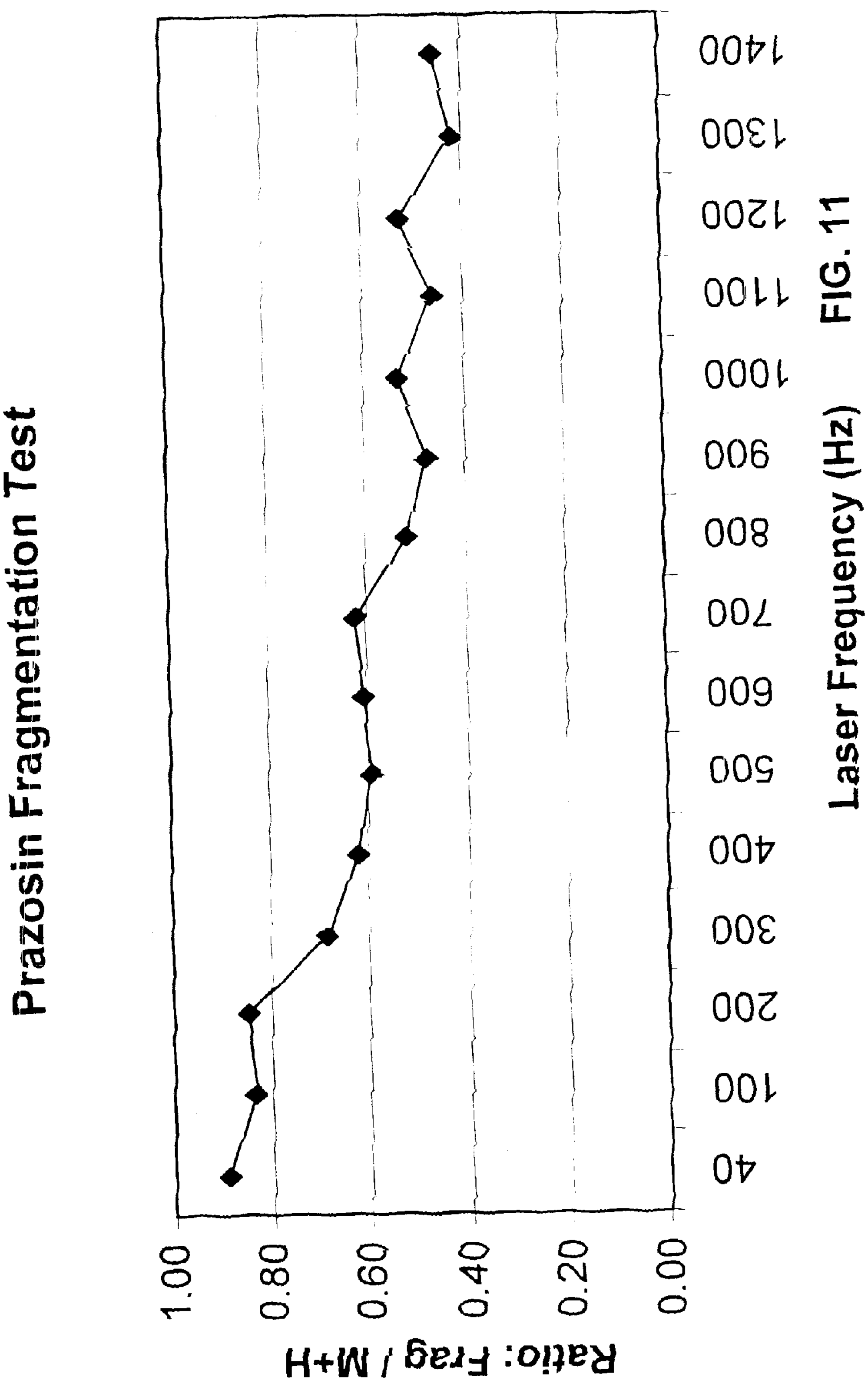
FIG. 11 is a chart showing an example of the ratio of the fragment ion intensity to the M+H intensity for Prazosin.

Higher laser pulse rates provide other benefits as well. Higher pulse rates at lower energy cause less molecular fragmentation in the ion source region that results in more precursor ions on which to perform MS/MS. Experiments were performed in which single MS Q1 spectra were taken as the laser pulse rate was varied. The intensity of the molecular ion (M+H) was measured as well as the intensity of the major fragment ion corresponding to M+H. FIG. 11 shows the ratio of the fragment ion intensity to the M+H intensity for Prazosin.

Figure 12:
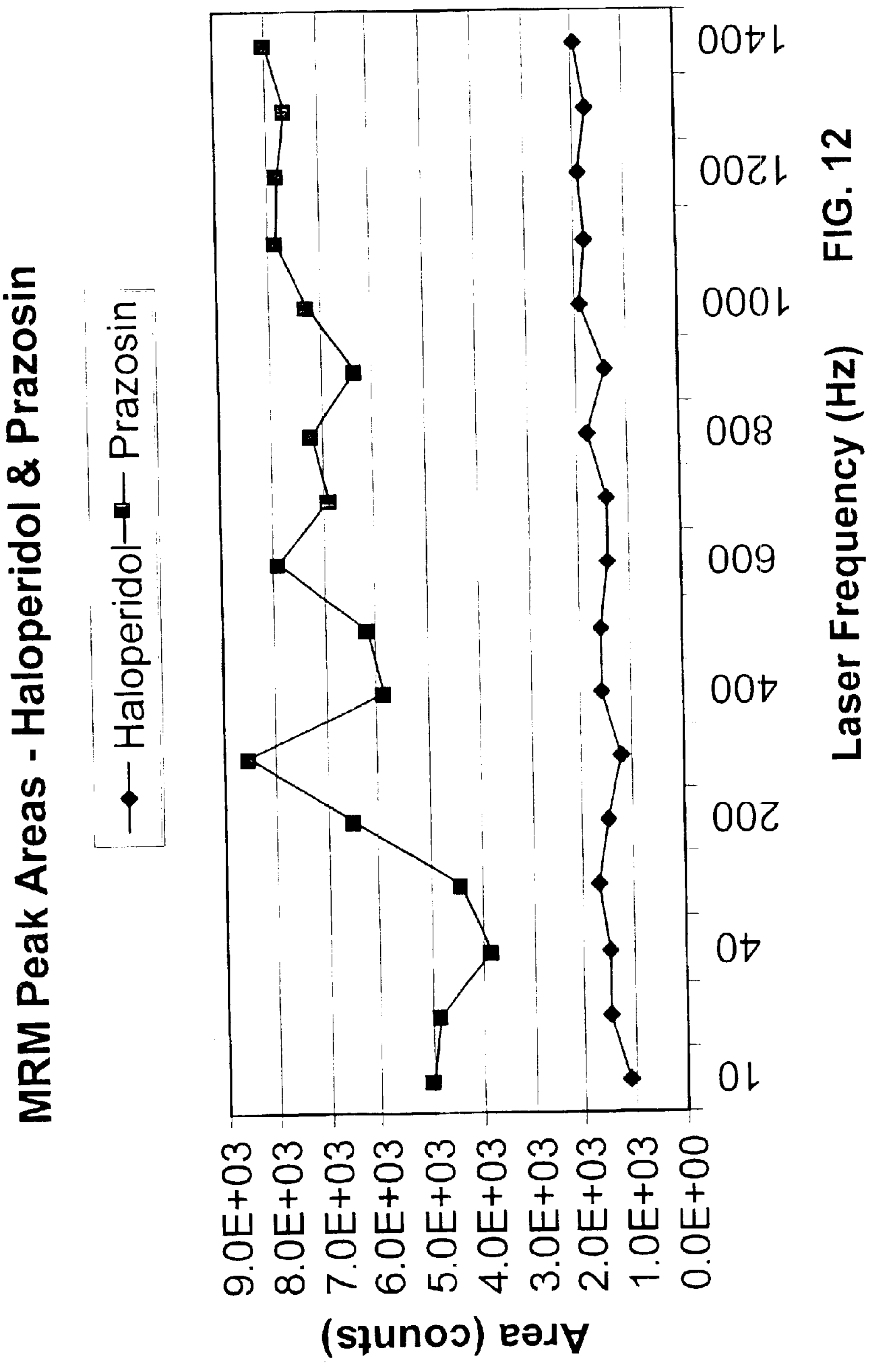
FIG. 12 is a chart showing examples of MRM peak areas as a function of laser pulse rate.

As the laser pulse frequency was varied the MS scan speeds were adjusted so that the same number of laser shots occurred for data taken at different frequencies. Molecular fragmentation was reduced by about a factor of two as the laser pulse rate was increased from 40 Hz to 1400 Hz. Since higher laser pulse rates cause less molecular fragmentation in the ion source, there is more molecular ion left intact on which to perform MS/MS experiments, such as MRM. FIG. 12 shows MRM peak area as a function of laser pulse rate, for Haloperidol and Prazosin. It is seen that there is a 60% to 100% increase in MRM peak area as the laser pulse rate was increased from 10 Hz to 1400 Hz.

The quantitation technique of the present invention offers several advantages over both conventional MALDI/TOF and orthogonal MALDI/TOF (or MALDI QqTOF). First, the sensitivity is significantly improved over MALDI QqTOF because of the high sensitivity of the triple quadrupole in an MRM mode, compared to that of a QqTOF. In the QqTOF, significant ion losses are encountered due to duty cycle limitations of the orthogonal TOF method, which only samples a portion of the ion beam (with the efficiency being lower at low mass than at high mass). Experience has shown that the absolute sensitivity or efficiency is 10 to 50 times better with MRM in a triple quadrupole than with the equivalent experiment on a QqTOF.

A second advantage is provided by the fact that MS/MS is a very specific detection technique, in which chemical noise background is usually very low. This is because only specific precursor/product ion combinations are monitored. In MALDI/TOF (where there is no efficient MS/MS capability), the chemical noise is usually high, especially at low mass. This chemical noise is due to matrix-related ions that are present in high abundance, and can obscure the signal from low-mass analyte ions. Therefore, the MS/MS capability of the triple quadrupole can allow the sensitive detection of even low mass ions that are present at much lower intensity than the matrix-related ions. Furthermore, MALDI/TOF has such a large ion flux that a transient recorder detection system must be used. This has the disadvantage of being somewhat noisy, so that single-ion events may not be detected. With the technique of the invention, the pulses are stretched out in time so that the ion flux is much lower, even if the same number of ions per pulse are received, so that a time-to digital converter can be used for pulse counting. This benefits MS/MS, since the noise levels are very low.

Thirdly, the fact that the mass spectrometer performance (in this case, the triple quadrupole) is independent of the laser fluence and sample morphology, allows the possibility of rapidly desorbing the sample from the surface, in order to improve the rate at which samples can be analyzed. For example, in MALDI/MS, the laser fluence must be kept low, near the ionization threshold, in order that the mass resolution and mass accuracy are not significantly affected. However, because of collisional cooling of the ion beam, the laser energy can be increased to the point just below that at which the sample will be thermally degraded occurs. This can allow more rapid desorption of the sample, and therefore allow more samples to be processed in a short period of time. Furthermore, the fact that the mass spectrometer analytical performance is independent of the sample morphology means that a larger region of the sample can be ionized at one time, by using a larger diameter laser beam. Inhomogeneities in the sample will have no effect on the mass spectrometer performance (mass resolution or mass position), in contrast to the situation with MALDI/TOF. Furthermore, the quasi-continuous nature of the ion beam allows the use of pulse counting methods (since the ion flux is still rather weak). Pulse-counting is inherently the most noise-free detection method for MS/MS, allowing the best signal-to-noise ratio.

The combination of a collisionally cooled MALDI ion source with a triple quadrupole in MRM mode and with high laser pulse rates therefore provides a very sensitive and rapid technique for the quantitative analysis of biological and pharmaceutical samples of small molecules. The ability to prepare samples off-line, and deposit them on sample plates means that methods of parallel sample processing can be used to extract and clean-up multiple samples off-line. Since generally the mass spectrometer is the most expensive part of the analytical system, the ability to prepare the samples for analysis in a batch mode, significantly improves the efficiency of the process.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of quantitatively detecting small molecules, comprising:

providing an ion source having a target surface carrying a sample material containing analyte molecules of a type of small molecules to be detected, small molecules being compounds not inherently polymeric in nature and not composed of repeating subunit classes of compounds;

operating a laser to apply a plurality of laser pulses to a selected area on the target source, wherein each laser pulse generates a plume of analyte ions from the analyte molecules in the sample material on the target surface;

collisionally damping the analyte ions in the plumes with a damping gas;

passing the collisionally damped analyte ions into a triple-quadrupole mass analyzer operated in a multiple-reaction monitoring mode to select ions of a precursor type derived from small molecules of the type to be detected and ions of a product type created by fragmenting ions of the precursor type; and counting ions of the product type selected by the triple-quadrupole mass analyzer.

2. A method as in claim 1, wherein the step of operating operates the laser at a pulse rate of about 500 Hz or higher.

3. A method as in claim 2, where in the pulse rate of the laser is between about 500 Hz and 1500 Hz.

4. A method as in claim 3, wherein the pulse rate of the laser is between about 1000 Hz and 1500 Hz.

5. A method as in claim 1, further including the step of generating a calibration curve for measurements in the multiple-reaction-monitoring mode.

6. A method as in claim 1, wherein the damping gas is provided in a radio-frequency ion guide operated to provide confinement to the analyte ions.

7. A method as in claim 1, wherein the step of operating operates the laser at a pulse rate selected to deplete the analyte molecules in the selected area of the target surface within about one second.

8. A method of quantitatively analyzing a sample material, comprising:

providing an ion source having a target surface carrying the sample material, the sample material containing analyte molecules of a type of small molecules to be detected, small molecules being compounds not inherently polymeric in nature and not composed of repeating subunit classes of compounds;

operating a laser at a pulse rate of about 500 Hz or higher to apply a plurality of laser pulses to a selected area on the target source, wherein each laser pulse generates a plume of analyte ions from the analyte molecules in the sample material on the target surface;

collisionally damping analyte ions in the plumes with a damping gas;

passing the collisionally damped analyte ions into a triple-quadrupole mass analyzer operated in a multiple-reaction monitoring mode to select ions of a precursor type and ions of a product type created by fragmenting ions of the precursor type; and counting ions of the product type selected by the triple-quadrupole mass analyzer.

9. A method as in claim 8, where in the pulse rate of the laser is between about 500 Hz and 1500 Hz.

10. A method as in claim 8, wherein the pulse rate of the laser is between about 1000 Hz and 1500 Hz.

11. A method as in claim 8, further including the step of generating a calibration curve for measurements in the multiple-reaction-monitoring mode.

12. A method as in claim 8, wherein the damping gas is provided in a radio-frequency ion guide operated to provide confinement to the analyte ions.

13. A method as in claim 8, wherein the pulse rate is selected to deplete the sample material in the selected area of the target surface within about one second.

14. A system for quantitative analyses of a sample material, comprising:

a target surface carrying the sample material, the sample material containing analyte molecules of a type of small molecules to be detected, small molecules being compounds not inherently polymeric in nature and not composed of repeating subunit classes of compounds;

a laser for generating laser pulses directed to the target surface, the laser being controlled to fire at a pulse rate of about 500 Hz or higher, wherein each laser pulse generates a plume of analyte ions from the analyte molecules in the sample material on the target surface;

a damping gas provided in an ion path of the plumes of analyte ions for collisionally damping the analyte ions in the plumes;

a triple-quadrupole mass analyzer disposed in the ion path after the damping gas and operated in a multiple-reaction monitoring mode to select from the analyte ions of a precursor type and ions of a product type created by fragmenting ions of the precursor type; and means for counting ions of the product type selected by the triple-quadrupole mass analyzer.

15. A system as in claim 14, wherein the laser is operated at a pulse rate between about 500 Hz and 1500 Hz.

16. A system as in claim 15, wherein the pulse rate of the laser is between about 1000 Hz and 1500 Hz.

17. A system as in claim 14, further includes a radio-frequency ion guide in which the damping gas is provided, the RF ion guide being operated to provide confinement of the analyte ions.

* * * * *